US011268455B2

(12) United States Patent
Burns et al.

(10) Patent No.: US 11,268,455 B2
(45) Date of Patent: Mar. 8, 2022

(54) THROTTLE BODY WITH FLUID FLOW CONTROL

(71) Applicant: Walbro LLC, Tucson, AZ (US)

(72) Inventors: Gary J. Burns, Millington, MI (US); William E. Galka, Caro, MI (US); Bradley J. Roche, Millington, MI (US); Albert L. Sayers, Caro, MI (US); David L. Speirs, Cass City, MI (US)

(73) Assignee: Walbro LLC, Cass City, MI (US)

( * ) Notice: Subject to any disclaimer, the term of this patent is extended or adjusted under 35 U.S.C. 154(b) by 57 days.

(21) Appl. No.: 16/331,394

(22) PCT Filed: Sep. 1, 2017

(86) PCT No.: PCT/US2017/049837
§ 371 (c)(1),
(2) Date: Mar. 7, 2019

(87) PCT Pub. No.: WO2018/048740
PCT Pub. Date: Mar. 15, 2018

(65) Prior Publication Data
US 2019/0195144 A1    Jun. 27, 2019

Related U.S. Application Data

(60) Provisional application No. 62/385,673, filed on Sep. 9, 2016.

(51) Int. Cl.
F02D 9/10    (2006.01)
F16K 3/06    (2006.01)
(Continued)

(52) U.S. Cl.
CPC ............. F02D 9/101 (2013.01); F02D 9/104 (2013.01); F16K 3/06 (2013.01); F02M 17/34 (2013.01); F02M 19/08 (2013.01)

(58) Field of Classification Search
CPC ......... F02M 19/08–088; F02M 21/047; F02M 17/09; F02M 17/34; F02D 9/10; F02D 9/101; F02D 9/1035; F16K 3/06
See application file for complete search history.

(56) References Cited

U.S. PATENT DOCUMENTS 1,390,681 A * 9/1921 Edwards ................. F02M 19/10
261/41.5
2,298,563 A * 10/1942 Hersch .................... F02M 33/04
48/189.4
(Continued)

FOREIGN PATENT DOCUMENTS

CN    103201496 A    7/2013
CN    104564450 A    4/2015
(Continued)

OTHER PUBLICATIONS

Thoenessen, DE 3343630, machine translation (Year: 1985).*
(Continued)

Primary Examiner — Hung Q Nguyen
Assistant Examiner — Mark L. Greene
(74) Attorney, Agent, or Firm — Reising Ethington P.C.; Matthew J. Schmidt

(57) ABSTRACT

A throttle body may have a main bore for supplying a fuel and air mixture to an engine. A throttle valve head may be received in the main bore and movable between idle and wide open positions to control fluid flow through the main bore. A main fuel outlet and a boost venturi may open to the main bore and a flow directing feature may alter the velocity and/or direction of fluid flow in the main bore relative to the fuel outlet or boost venturi. The flow directing feature may be carried by the body, the throttle valve head, or the boost venturi.

18 Claims, 5 Drawing Sheets

(51) Int. Cl.
*F02M 17/34* (2006.01)
*F02M 19/08* (2006.01)

(56) References Cited

U.S. PATENT DOCUMENTS

| | | | | | |
|---|---|---|---|---|---|
| 2,328,736 | A | * | 9/1943 | Mock | F02M 17/50 261/65 |
| 2,675,216 | A | * | 4/1954 | Eickmann | F02M 1/10 261/39.3 |
| 2,793,634 | A | * | 5/1957 | Ericson | F02M 1/043 123/179.3 |
| 3,118,009 | A | * | 1/1964 | Phillips | F02M 17/04 261/35 |
| 3,176,704 | A | * | 4/1965 | De Palma | F02D 9/1015 137/239 |
| 3,252,539 | A | | 5/1966 | Ott et al. | |
| 3,298,677 | A | | 1/1967 | Anderson | |
| 6,003,490 | A | * | 12/1999 | Kihara | F02D 9/1015 123/337 |
| 6,971,632 | B2 | * | 12/2005 | Elliot | F02D 9/1015 123/337 |
| 9,115,677 | B2 | | 8/2015 | Stockbridge et al. | |
| 10,001,067 | B2 | * | 6/2018 | Tobinai | F02M 1/02 |
| 11,008,951 | B2 | * | 5/2021 | Burns | F02M 9/08 |
| 2003/0042448 | A1 | | 3/2003 | Conley et al. | |
| 2013/0298868 | A1 | | 11/2013 | Wittkopf et al. | |

FOREIGN PATENT DOCUMENTS

| | | | | |
|---|---|---|---|---|
| DE | 3343630 | A1 * | 6/1985 | F02M 7/22 |
| DE | 10321090 | A1 * | 12/2004 | F02M 35/10222 |
| EP | 2202397 | A2 | 6/2010 | |
| WO | WO-2015130932 | A1 * | 9/2015 | F02M 1/02 |

OTHER PUBLICATIONS

Reulein, DE 10321090, machine translation (Year: 2004).*
Written Opinion & International Search Report for PCT/US2017/049837 dated Dec. 13, 2017, 15 pages.
CN Office Action for CN Application No. 201780055309.2 dated Mar. 23, 2021 (7 pages).

* cited by examiner

THROTTLE BODY WITH FLUID FLOW CONTROL

REFERENCE TO RELATED APPLICATION

This patent application claims the benefit of the earlier filed U.S. Provisional Patent Application, Ser. No. 62/385,673, filed on Sep. 9, 2016, which is incorporated herein by reference in its entirety.

TECHNICAL FIELD

The present disclosure relates generally to a throttle body for providing a fuel and air mixture to an engine.

BACKGROUND

A variety of fuel injection throttle body configurations are known for supplying a fuel and air mixture to an internal combustion engine to support its operation in which a liquid gasoline fuel is injected into a main bore at a relatively high pressure typically in the range of 6 to 40 psi and sometimes up to 80 psi or more above ambient atmospheric pressure or 21 to 55 psi or more to facilitate mixing or dispersion of the liquid fuel in the fuel and air mixture supplied to the engine. To control the rate of flow of the mixture to the engine, a throttle valve with a planar valve head in the main bore is carried on a shaft that is rotated to move the valve head between an idle position, associated with low speed and/or low load engine operation, and a wide open or fully open position, associated with high speed and/or high load engine operation. Typically a fuel pump and pressure regulator supplies liquid fuel at this high pressure to a fuel metering valve or injector which is opened and closed by an electronic controller such as a microcontroller at defined times to discharge the appropriate quantity of fuel into the main bore for the current operating condition of the engine. Typically the fuel metering valve is located upstream of the throttle body valve head or much further downstream of the throttle body and proximate to the engine fuel intake port or engine intake valve pocket.

SUMMARY

In at least some implementations a throttle body may have a main bore from which a fuel and air mixture is supplied to the engine, a throttle valve head movable between an idle and a wide open position to control at least some flow through the main bore to the engine, a main fuel outlet open to the main bore, and a flow directing feature altering at least one of the velocity or direction of at least a portion of the fluid that flows in the main bore relative to the main fuel outlet. In at least some implementations fuel flow through the main fuel outlet may be electronically controlled. In at least some implementations the flow directing feature may direct a portion of air flowing in the main bore toward the main fuel outlet. In at least some implementations the main fuel outlet discharges fuel into a boost venturi. In some implementations the boost venture may preferably be located downstream of the throttle valve head. In some implementations, a main fuel outlet discharges fuel into the boost venturi and the flow directing feature directs a portion of air flowing in the main bore into the boost venturi. In at least some implementations, the flow directing feature may be carried by at least one of the throttle valve head, body and the boost venturi. In at least some implementations the flow directing feature may include a non-planar portion of or carried by the throttle valve head. In at least some implementations, one or more projections may extend from the valve head. In at least some implementations, the flow directing feature may include a channel through which air flowing in the main bore is directed toward the boost venturi and in some implementations the channel may be centered about a plane that includes a center axis of the boost venture.

BRIEF DESCRIPTION OF THE DRAWINGS

The following detailed description of preferred embodiments and best mode will be set forth with reference to the accompanying drawings, in which.

DETAILED DESCRIPTION OF THE PREFERRED EMBODIMENTS

Figure 1:
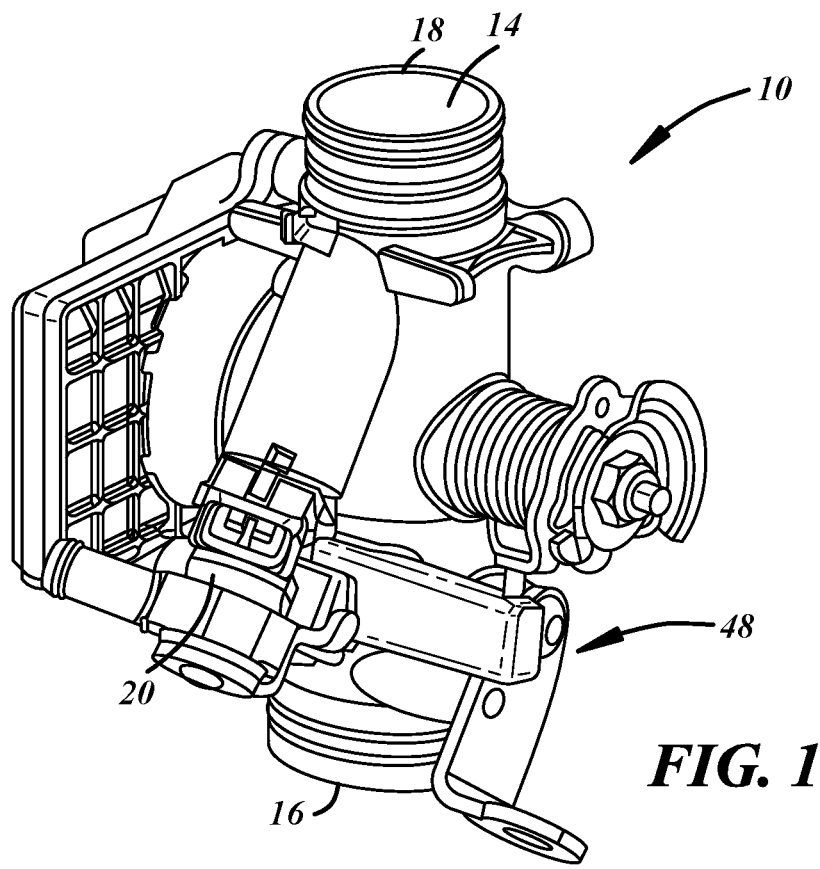
FIG. 1 is a perspective view of a throttle body including a flow directing feature.
Figure 2:
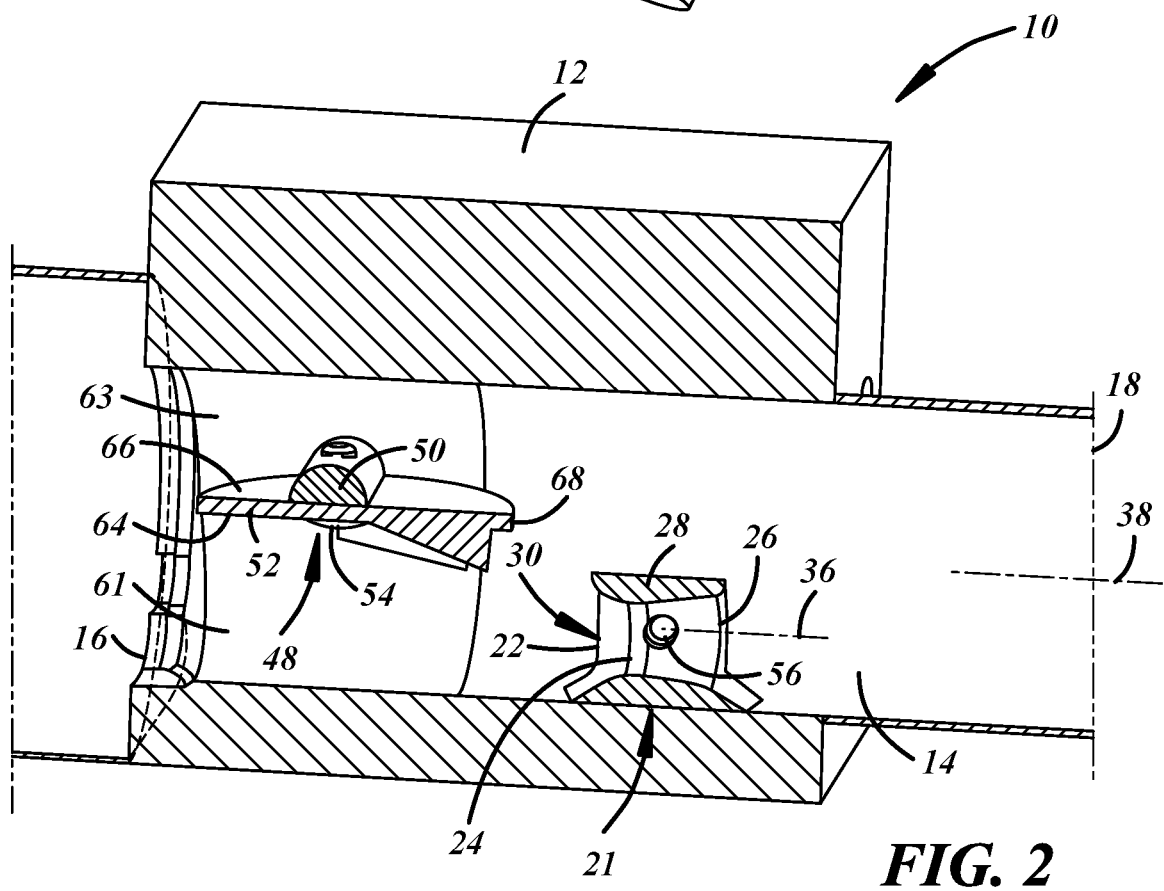
FIG. 2 is a sectional view of a throttle body showing a throttle valve with at least one flow directing feature and a boost venturi.
Figure 3:
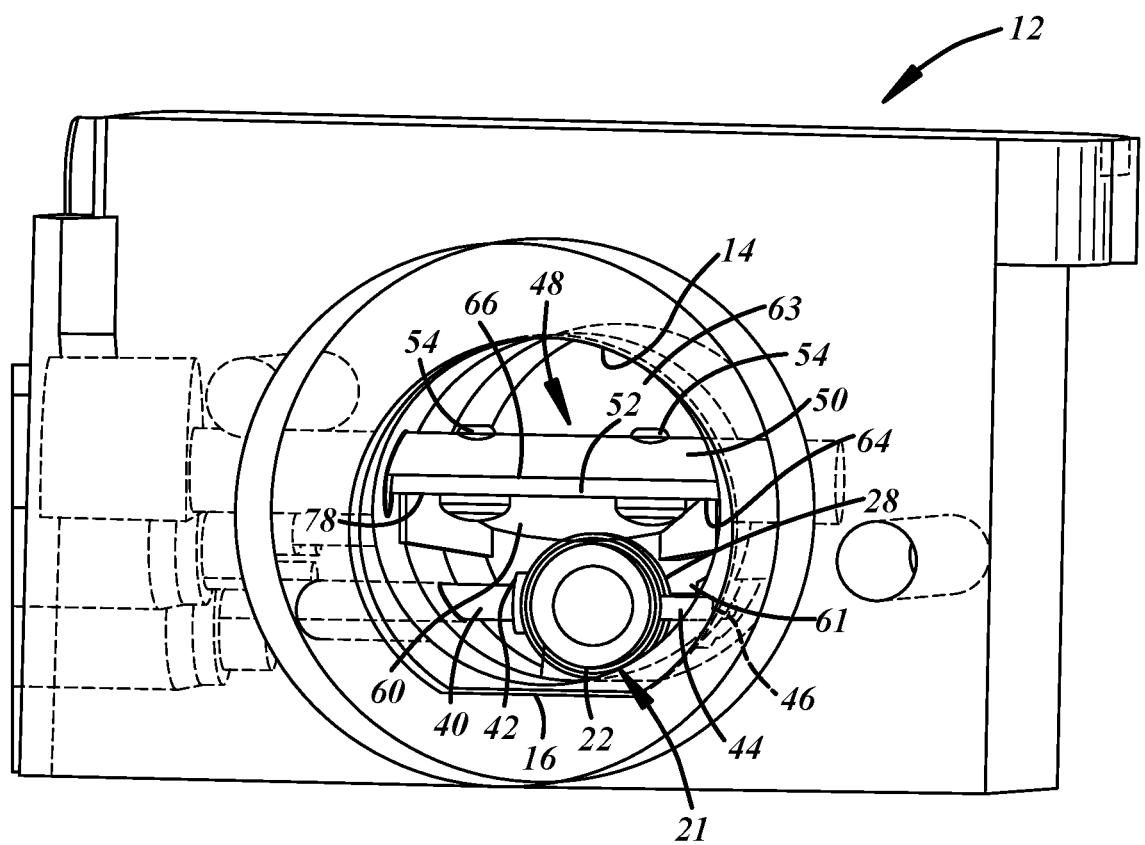
FIG. 3 is an end view of the throttle valve of FIG. 2.

Referring in more detail to the drawings, FIGS. 1-3 illustrate a throttle body 10 that provides a fuel and air mixture to an engine to support operation of the engine. The throttle body 10 has a main body 12 (typically cast metal) with a main bore 14 through which air flows from an inlet side 16, usually positioned adjacent to an air filter, to an outlet side 18, usually positioned adjacent to an engine intake. The throttle body 10 also has one or more fuel circuits through which fuel is provided into the main bore 14 and combined with air flowing through the main bore 14 to form the fuel and air mixture. The fuel circuit(s) may include a fuel injector or other fuel metering device 20, through which fuel is discharged into the main bore 14. In at least some implementations, the fuel may be discharged at a pressure of 1 bar or less, including some systems having a fuel pressure of 0.35 bar or less.

The main bore 14 may have any desired shape including (but not limited to) a constant diameter cylinder or a venturi shape wherein the inlet 16 leads to a tapered converging portion that leads to a reduced diameter throat that in turn leads to a tapered diverging portion that leads to the outlet 18. The converging portion may increase the velocity of air flowing into the throat and create or increase a pressure drop in the area of the throat. Especially when a fuel injector or other metering device 20 is used and fuel is provided under some positive pressure, a straight cylindrical bore can be used as it provides less restriction to air flow compared to bores of non-uniform diameter or cross-sectional area, and the fuel flow provided through the control valve can be metered to match the air flow over a wide range of conditions.

Figure 4:
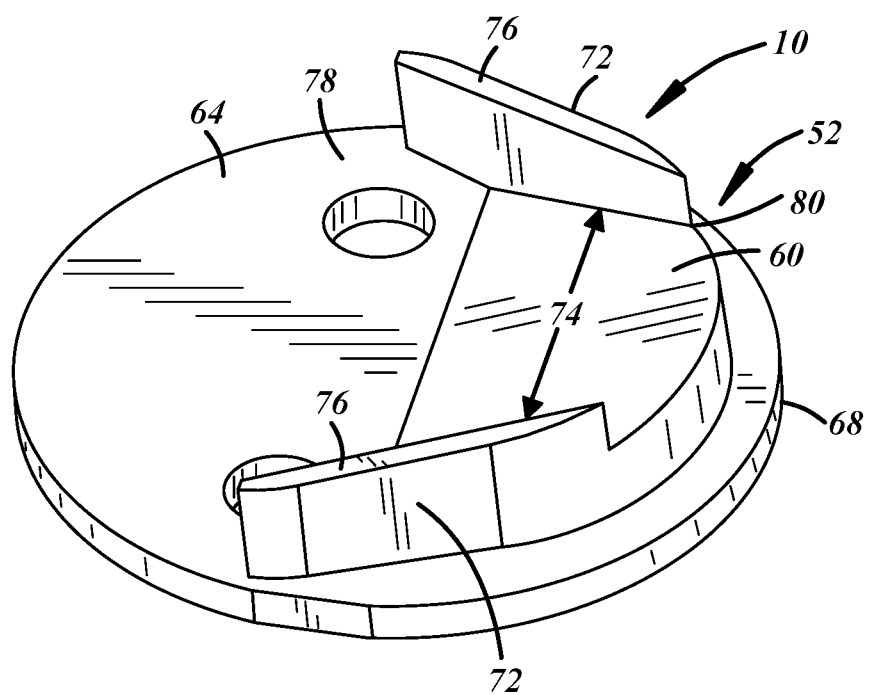
FIG. 4 is a perspective bottom view of a throttle valve head as shown in FIGS. 2 and 3.
Figure 5:
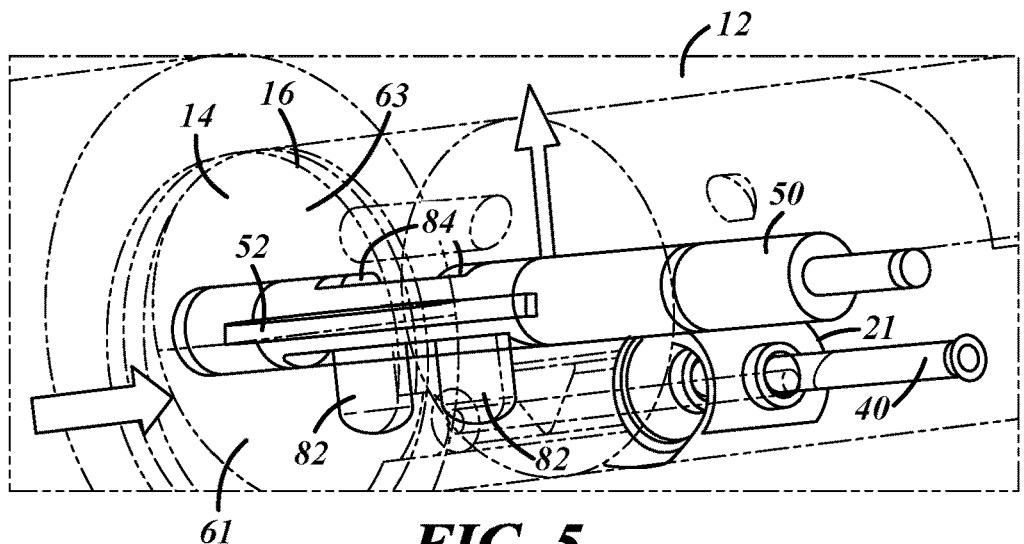
FIG. 5 is a perspective view of a throttle body with portions shown transparent to illustrate a boost venturi and throttle valve with one or more flow directors within the throttle body and a boost venturi.

In at least some implementations, a secondary venturi, sometimes called a boost venturi 21 may be located within the main bore 14 whether the main bore 14 has a venturi shape or not. The boost venturi 21 may have any desired shape, and as shown in FIGS. 4 and 5, has a converging inlet portion 22 that leads to a reduced diameter intermediate throat 24 that leads to a diverging outlet 26. The boost venturi 21 may be coupled the to throttle body 10 within the main bore 14, and in some implementations, the throttle body may be cast from a suitable metal and the boost venturi 21 may be formed as part of the throttle body, in other words, from the same piece of material cast as a feature of the throttle body when the remainder of the throttle body is formed. The boost venturi 21 may also be an insert coupled in any suitable manner to the throttle body 10 after the throttle body is formed. In the example shown, the boost venturi 21 includes a wall 28 that defines an inner passage 30 that is open at both its inlet 22 and outlet 26 to the main bore 14. A portion of the air that flows through the throttle body 10 flows into and through the boost venturi 21 which increases the velocity of that air and decreases the pressure thereof. The boost venturi 21 may have a center axis 36 that may be generally parallel to a center axis 38 of the main bore 14 and radially offset therefrom, or the boost venturi 21 may be oriented in any other suitable way. As shown in FIG. 2, the boost venturi may be formed separately from the main body 12, as an insert that is assembled into the main body after the main body is formed. In the example shown, the boost venturi 21 is supported at least partially by a cylindrical protrusion or a rod 40 (FIG. 3) that extends from the main body 12, into the main bore 14 and to a boss or other support 42 in the wall 28 of the boost venturi. As also shown, the boost venturi 21 may be supported by a flange 44 extending from the wall 28 and received within a slot or groove 46 in the main bore 14 (or conversely, a flange extending from the body 12 in the main bore 14 and received within a slot in the wall 28). The support and flange 42, 44 may be generally diametrically opposed and arranged so that the boost venturi 21 is supported at a desired height within the main bore 14 which may, but need not, locate a bottom surface of the wall 28 against a surface of the main body 12 that defines the main bore 14.

The throttle body 10 may include a throttle valve 48 carried by the main body 12 for adjusting the flow rate of the fuel and air mixture out of the throttle body 10. The throttle valve 48 includes a throttle shaft 50 and a throttle valve head 52 mounted, such as by one or more screws 54, to the throttle shaft 50. The throttle shaft 50 is rotatably carried by or relative to the body 12 and extends transversely across the main bore 14 to enable rotation of the throttle valve head 52 relative to the main bore. In at least some implementations, the throttle valve head 52 is defined by a flat disc commonly referred to as a butterfly valve head. The throttle valve 48 is rotated between an idle position and a wide open position, and may be operated at various positions in between those two positions. In the idle position, the throttle valve head 52 is substantially transverse to the axis 38 of the main bore 14, and may be rotated between about 3 and 20 degrees from a plane that is transverse to the axis 38. In this position, the throttle valve head 52 provides a maximum restriction to air flow out of the main bore 14, but allows sufficient air or fluid flow to support idle engine operation. In the wide open position of the throttle valve 48, shown in FIG. 2, the throttle valve head 52 typically is generally parallel to the axis 38 of the main bore 14 (where generally parallel is within 10 degrees of parallel), and provides a minimum restriction to air flow out of the main bore and to the engine. The throttle valve head 52 is disposed adjacent to the inlet side 16 of the throttle body, and upstream of (at least when the throttle valve is in its idle position) a main fuel outlet 56 and the boost venturi 21.

The main fuel outlet 56 opens into or is otherwise communicated with the main bore 14 and is in communication with the fuel metering device 20 (e.g. a fuel injector or a fuel flow control valve) to enable fuel flow into the main bore 14. The fuel metering device may be carried by the body 12 and may provide a metered flow of fuel into a fuel passage leading to the fuel outlet 56. The main fuel outlet 56 may include a port which may be formed in the body 12 or defined by an insert assembled into the body, such as the rod 40 coupled to the boost venturi 21 which may be hollow and define a fuel passage. The main fuel outlet 56 may be located between the inlet and outlet sides 16, 18 of the main bore 14 and may be within or downstream of a narrower portion of the main bore (if provided) which acts as a venturi to increase flow velocity and decrease fluid pressure near the main fuel outlet 56. Of course, the main bore need not have a venturi portion or venturi shape, as noted above. In at least some implementations, the fuel outlet 56 and a center of the boost venturi (taken perpendicular to the boost venturi axis 36) may be located closer to the outlet 18 of the main bore than the inlet 16. The fuel outlet 56 may be a simple port open to the boost venturi passage 30, may be defined in a conduit or tube 40 extending into the boost venturi 21, and/or may include more than one opening or port open into the boost venturi or downstream thereof.

Figure 12:
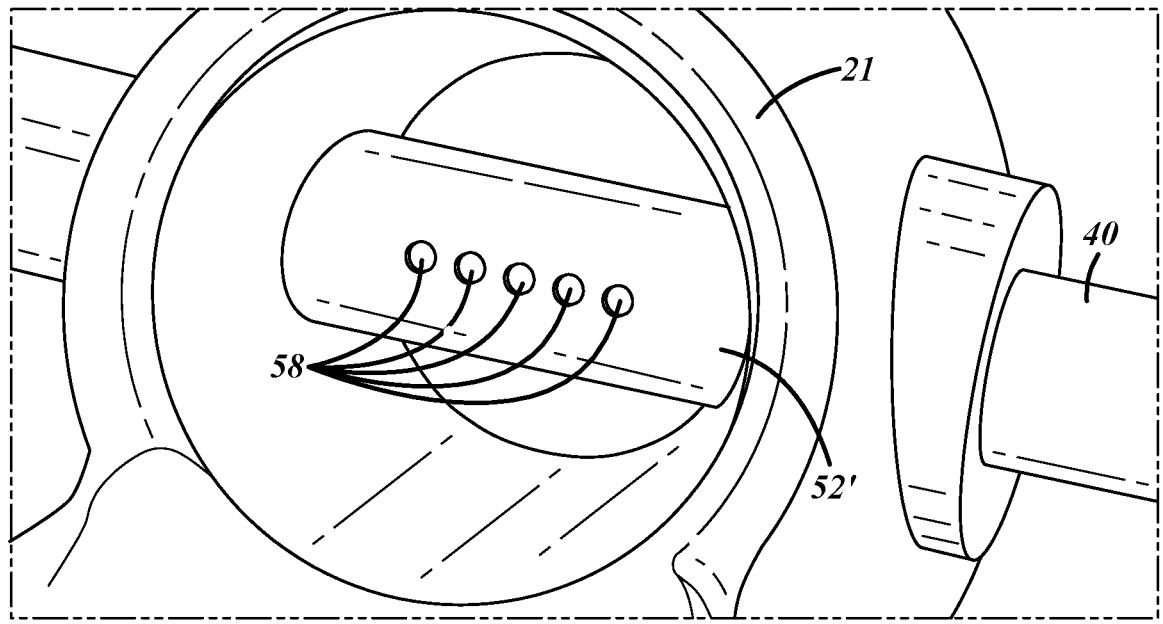
FIG. 12 is partial perspective view of a throttle body including a boost venturi and a fluid outlet ports arranged in the boost venturi.

In one example shown in FIG. 12, the fuel outlet includes more than one port 58 formed in a tube 59 that extends across the boost venturi 21 perpendicular to the direction of fluid flow through the boost venturi, and the ports may face downstream (i.e. toward the outlet end 18). The tube 59 may create boundary layer flow effect as the air flows around the tube and that may improve mixing of the fuel and air. The tube 59 also reduces the air flow area in that location of the boost venturi 21 which may increase air flow velocity. The downstream facing ports 58 may also reduce the effects that transient reverse flow pressure waves have on the fuel ports, to reduce or eliminate multiple fuel discharge events due to such transient waves.

To aid in directing air flow in the area of the main fuel outlet 56, a flow directing feature may be associated with, such as by being carried by, at least a portion of the throttle valve head 52. In the embodiment of FIGS. 1 and 2, one flow directing feature is implemented by a bent, curved or otherwise non planar portion 60 of the throttle valve head 52. The non-planar portion 60 of the throttle valve head 52 is provided in a downstream portion of the throttle valve head and it is oriented so that it is angled toward the boost venturi and/or the main fuel outlet when the throttle valve 48 is in its second or wide open position. The non-planar portion 60 may be provided at an angle of between 1 and 170 degrees relative to the remainder of the throttle valve head 52. Where an angle of 80 degrees is perpendicular to air flow, angles of 80 degrees or more may tend to cause turbulence and may be useful where increased mixing of fluid is desired (although such angles may be used for other reasons). Angles less than 80 degrees, and particularly less than 45 degrees, for example between 3 and 45 degrees, may more smoothly guide or direct fluid flow, in at least some implementations. The non-planar portion 60 may begin downstream of the throttle valve shaft, if desired. Of course, the bent or angled non-planar portion 60 could be provided in any suitable location or orientation to direct/control air flow as desired, including at a different angle relative to the airflow and starting/ending at different locations along the throttle valve head 52. Further, more than one area may be angled or offset relative to other portions of the throttle valve head 52, and/or more than one bend may be provided.

Also, as shown in FIG. 1, when the throttle valve 48 is in its second position, the throttle valve head 52 substantially divides into two sections the portion of the main bore 14 in which the throttle valve head is received. A first section 61 is directly open to the main fuel outlet 56 and adjacent to a first side 64 of the throttle valve head 52, and a second section 63 is spaced and generally separate from the main fuel outlet 56 and adjacent to an opposite, second side 66 of the head 52. Thus, air flowing into the main bore inlet 16 when the throttle valve is in its open position is divided into two streams by the throttle valve head 52, at least temporarily or during at least a portion of the length of the main bore between the inlet 16 and the outlet 18. The streams may converge and join together downstream of the throttle valve head 52 and a single output fluid flow may be provided from the outlet end 18 of the main bore 14.

In addition to increasing fluid flow velocity near the main fuel outlet 56, the non-planar portion 60 of the throttle valve head 52 can also direct the air flow in the first section 61 away from the second section 63 to maintain and even promote separation of the fluid streams. In this regard, the non-planar portion 60 of the throttle valve head 52 may extend to or within 3 mm of the downstream edge 68 of the throttle valve head 52, and may serve to provide a more consistent stream of air to the inlet of the boost venturi 21 to enable some control over the fluid flow in and through the boost venturi over a wider range of throttle valve positions and engine operating conditions.

Figure 10:
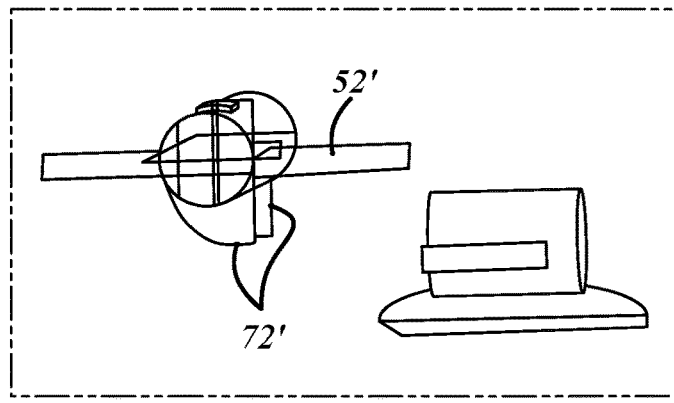
FIG. 10 is a side view of a throttle valve with at least one flow directing feature.
Figure 11:
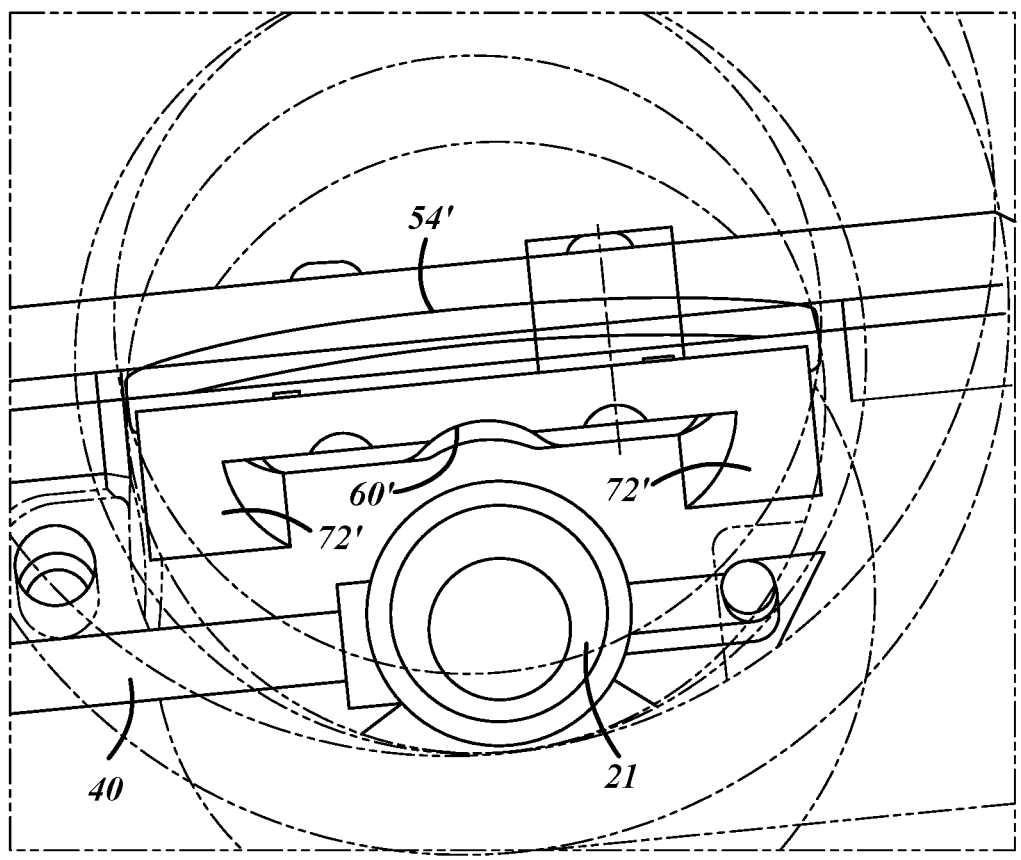
FIG. 11 is an end view of the throttle valve of FIG. 10.

In addition to or instead of the non-planar portion 60 of the throttle valve head 52, a second flow directing feature 70 may be provided in the area of the boost venturi 21. This flow directing feature 70 may be separate from the throttle body main body 12 (e.g. not a restriction formed in the main bore 14) and is arranged to direct and control air flow in the area of the boost venturi or main fuel outlet if no boost venturi is provided. In the implementation shown in FIGS. 1-3, the flow directing feature 70 includes one or more projections 72 carried by the throttle valve head 52 and defining a further non-planar portion of the throttle valve head 52. The projections 72 may be formed integrally in the same piece of material that defines the remainder of the throttle valve head 52 including the first flow directing feature (e.g. non-planar portion 60), or they may be separate components that are each attached to or otherwise carried by the throttle valve head 52, or they may be connected together within a separate component that is attached to the throttle valve head 52. As shown, the projections 72 extend outwardly from the first side 64 of the throttle valve head 52 and define a channel 74 between them. In this implementation, the projections 72 are cantilevered on the valve head 52 such that each projection 72 has a free end 76 and the channel 74 is not enclosed. If desired, the projections could be joined together (e.g. at the free ends) by a spanning wall to define an enclosed channel of any desired shape. Further, while the projections 72 are shown as generally straight or planar, they could be curved or bent in any desired shape and of any desired size, spacing and orientation. FIGS. 10 and 11 illustrate another example of throttle valve head 52' with projections 72' and a non-planar portion 60' defining a further flow directing feature this is formed by a groove or other void, instead of an outward projection as in the first example non-planar portion 60. Still other arrangements of flow directing features may be used.

As shown in FIGS. 3 and 4, the channel 74 includes an inlet end 78 upstream of an outlet end 80, and the inlet and outlet ends are generally aligned with regard to the direction of fluid flow in the main bore 14. The distance between the projections 72 is less at the outlet end 80 than the inlet end 78 (i.e. the projections converge toward the outlet end) so the channel narrows from the inlet end 78 to the outlet end 80. Because of this, air flowing through the channel 74 tends to increase in velocity from the inlet end 78 to the outlet end 80, and air is further directed by the channel 74 toward the main fuel outlet 56. Thus, in this example, both the non-planar portion 60 of the throttle valve head 52 and the projections 72 tend to increase the velocity of at least some of the fluid in the first section 61 of the main bore 14, and direct some of that fluid stream toward the boost venturi 21.

When used with a throttle valve head 52 having a non-planar portion 60, at least part of the projections 72 may extend along at least a portion of the non-planar portion 60 of the throttle valve head 52. Thus, both flow directing features 60, 70 work together in promoting a desired air flow through at least part of the main bore 14. As best shown in FIGS. 1 and 2, the projections 72 may extend away from the first side 64 of the throttle valve head 52 and may radially overlap at least a portion of the boost venturi 21 when the throttle valve 48 is in its second or fully open position. A downstream end of the projections may axially overlap at least part of the boost venturi (e.g. the inlet end), if desired, or be within about 1 mm of the inlet end of the boost venturi for clearance purposes or otherwise. Hence, the increased velocity air stream through the channel 74 is directed close to and toward the boost venturi 21 and may have its maximum velocity at or near the center of the boost venturi 21 to provide a greater pressure drop across the boost venturi. Still further, the trailing or downstream edge of the throttle valve head 52 may be located between 2 mm and 8 mm from the inlet 22 of the boost venturi. If the throttle plate is too far away, the air flow from the flow directing features will dissipate and the effects thereof will be reduced. If the throttle plate is too close, the airflow might be turbulent and not as predictable, and/or the movement of the throttle plate may be interfered with by the boost venturi.

In FIG. 5, the projections 82 are defined or carried by fasteners 84 that connect the throttle valve head to the valve shaft. The fasteners 84 or other projections 82 extend outwardly from the valve head 52 and are arranged to extend into the second section 63 of the main bore 14 when the throttle valve 48 is in its second position. The projections 82 disrupt the air flow and produce three separate streams—one between the surface of the main bore 14 and a first projection, a second between the surface of the main bore and second projection and a third in a channel 86 defined between the projections 82. The streams are only temporarily separate and then join together downstream of the projections 82 and upstream of the boost venturi 21. In at least some implementations, the third stream that flows between the projections 82 may be aligned with the boost venturi inlet 22 and serve to provide a more direct air flow source to the boost venturi 21 for more consistent fluid flow in and through the boost venturi. The projections 82 may have a length, size and shape as desired to create desired air streams, eddies and other flow qualities to provide a desired flow rate and/or pressure signal at or across the boost venturi 21. In the example shown, the projections 82 are generally right cylindrical bodies that extend perpendicular to the face of the throttle valve head 52, although other shapes and orientations may be used.

While shown as extending within the first section 61 of the main bore 14 (i.e. a section including or aligned in the direction of air flow with the boost venturi 21), a flow directing feature may be used elsewhere in the throttle body 10. For example, the second side 66 of the throttle valve head 52 could include a flow directing feature arranged to direct flow out of the second section of the main bore and toward the boost venturi or otherwise as desired. As just one other example, fluid in the second section 62 could be directed away from the first section 61 to, for example, encourage mixing of an air stream with a fuel and air mixture downstream of the boost venturi. Further, while the offset or angled non-planar portion 60 of the throttle valve head 52 may be defined by a bend in the throttle valve head 52, it could be implemented in a thicker portion of the throttle valve head. The second side 66 of the throttle valve head 52 could be planar (e.g. not include a bend) or even include an angled or ramped surface directed away from the first section 61 of the main bore 14. The throttle valve head 52 may be formed from any suitable material, such as various metals and plastics, with all features formed in one, integral piece of material, or from multiple pieces of material.

Figure 6:
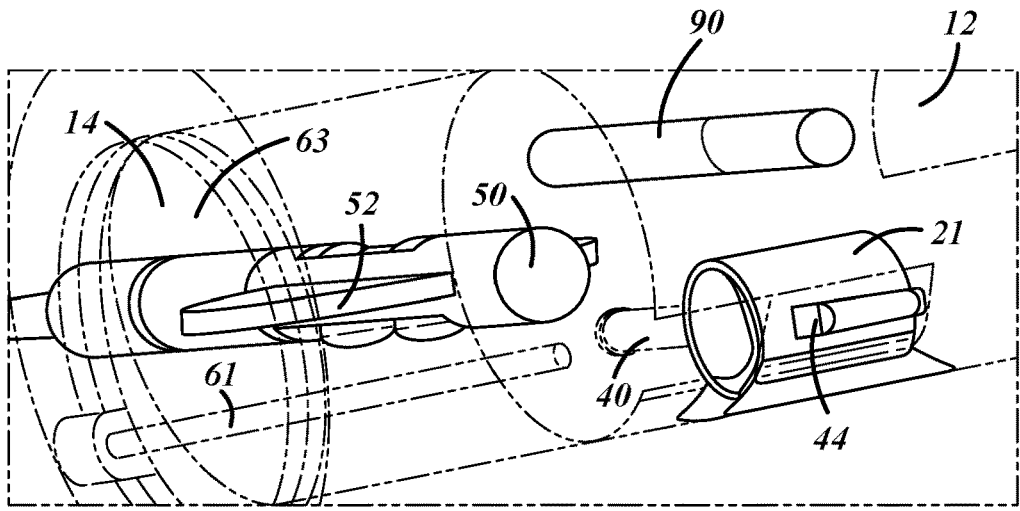
FIG. 6 is a perspective view of a throttle body including a throttle valve, boost venturi and a flow director separate from both the throttle valve and boost venturi.
Figure 7:
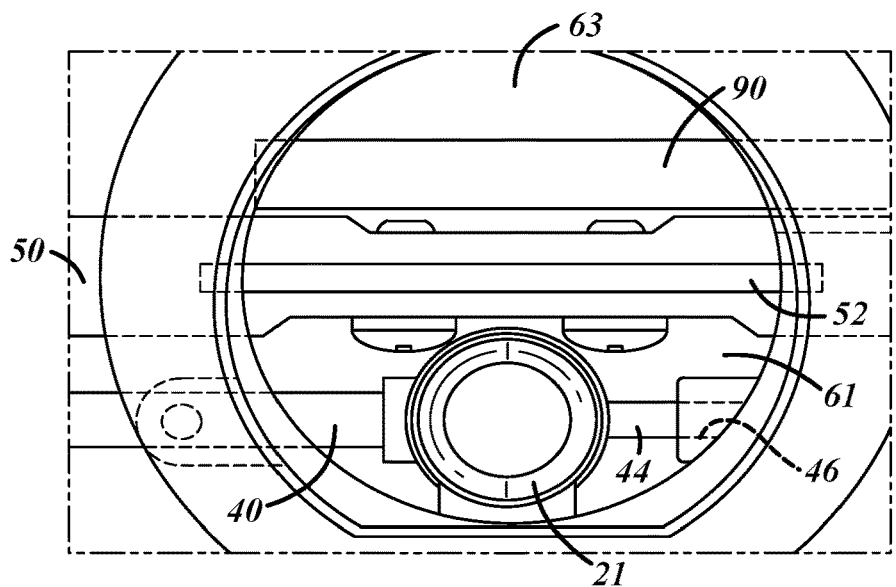
FIG. 7 is an end view of the throttle body of FIG. 6.

Further, as shown in FIGS. 6 and 7, a flow directing feature 90 may be provided in the main bore 14 and within the second section 63 to restrict air flow in the second section and encourage air in the second section to flow toward the first section 61. The flow directing feature 90 may be carried by the main body 12 so that it projects at least partially into the main bore 14. In the example shown, the flow directing feature includes a projection 90 extending across the main bore 14, is not parallel to the axis 38 of the main bore, and is in the form of a cylindrical rod 90 that in at least some implementations may be arranged parallel to the throttle valve shaft 50 and is connected to the main body at both ends. Of course, the projection 90 may have other shapes and orientations, and more than one projection may be provided. The rod 90 divides air flowing in the second section 63 into two streams, one stream above and one stream below the rod, with the stream flowing below the rod directed toward the first section 61 and the boost venturi 21 therein. This may assist or increase air flow into the boost venturi inlet 22 and/or encourage or improve mixing of air in the main bore 14 with the air and fuel mixture discharged from the boost venturi.

Figure 8:
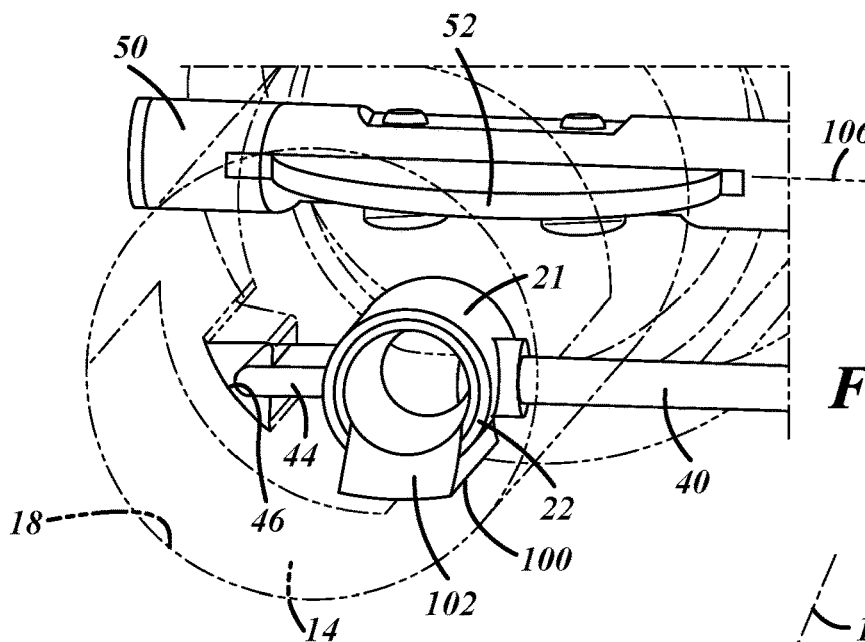
FIG. 8 is a fragmentary side view of a throttle body.
Figure 9:
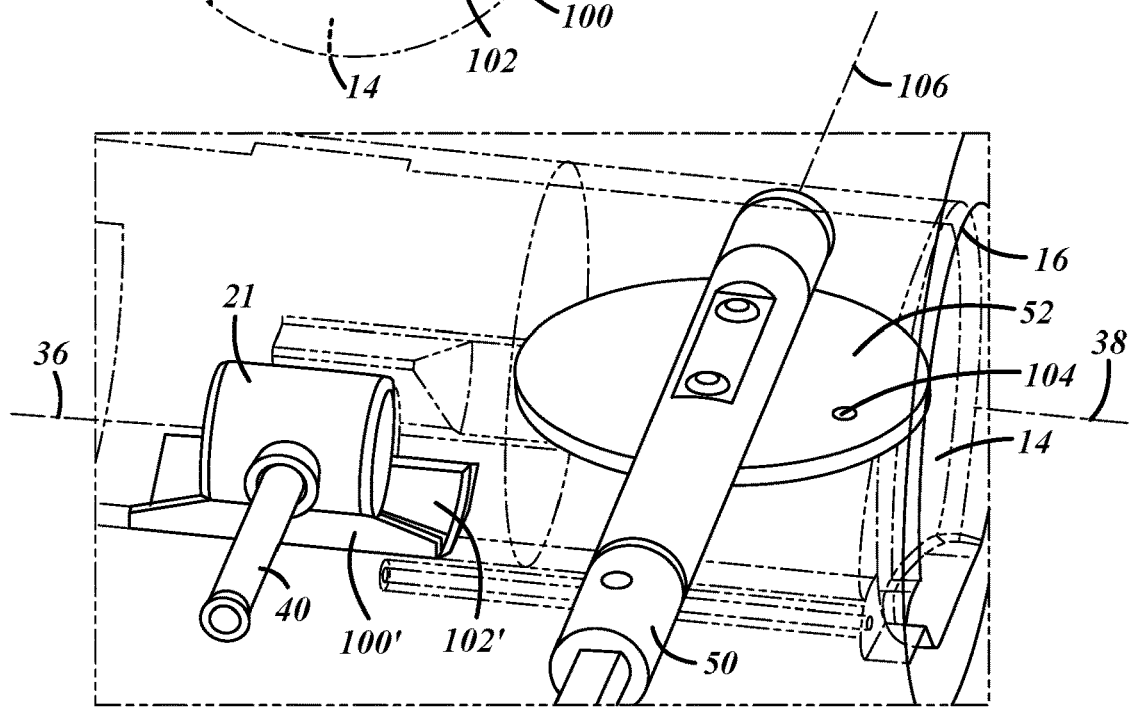
FIG. 9 is an end view of a throttle body showing a throttle valve and boost venturi.

One or more flow directing features may also be formed on, carried by or associated with the boost venturi 21. In the examples shown in FIGS. 8 and 9, the boost venturi includes a projection 100, 100' that extends upstream of the boost venturi inlet 22 and is arranged to direct air into the inlet. In the example shown in FIG. 8, the projection 100 includes an inclined ramp surface 102 arranged to direct air flowing adjacent to the surface of the main bore 14 to the inlet 22 which may be spaced from the surface of the main bore 14. As shown in FIG. 9, the projection 100' includes a surface 102' that is inclined and also curved in a direction perpendicular to the air flow in the main bore 14 to provide at least partially raised sides, and a projection that is a portion of a cylinder or generally scoop-shaped to direct more air to the inlet 22. While shown as extending along a lower surface of the main bore 14 and to a lower portion of the inlet 22, a projection could instead or also be positioned adjacent to an upper portion of the boost venturi, and/or a side of the boost venturi to direct air toward the inlet as desired. In at least some implementations, the projection may define a complete or partial funnel or other structure that is larger at its upstream end spaced from the inlet than at its downstream end adjacent to the inlet.

Further, the throttle valve head 52 may include an opening 104 through which air flows when the throttle valve is in its first position (e.g. idle) and in positions between the first and second positions (e.g. up to 50% of throttle valve movement away from the idle position), as shown in FIG. 9. The opening may be oriented or positioned as desired, and may be generally aligned with the boost venturi 21 when the throttle valve 48 is in its first position to direct air flow to or toward the boost venturi and provide a desired air flow rate and/or pressure signal at the boost venturi. Among other things, this may promote flow out of the boost venturi 21, and mixing of the fuel and air. The opening 104 may also be considered a flow directing feature and may advantageously promote a desired fluid flow in the main bore 14. The opening 104 may be defined by a simple hole through the valve head 52, a notch of flat on an edge of the valve head or in a lengthier projection extending from and carried by the valve head.

A throttle valve head 52 may be mounted off-center relative to the main bore 14 such that one of the two sections 61, 63 is larger than the other, as desired. In other words, a rotational axis 106 of the throttle valve shaft 50 does not intersect the axis 38 of the main bore 14. In at least some implementations, the main bore axis 38 may extend between the throttle valve shaft axis 106 and the boost venturi axis 36. Hence, when the throttle valve 48 is in its second or open position, more than half of the area of the main bore 14 may be open in the first section 61, and the flow directing features may then direct more air toward the fuel outlet and/or boost venturi. In at least some implementations, the throttle shaft axis 106 may be offset from the main bore axis 38 by between 0.5 mm to 6 mm (and as noted above this may make the first section 61 larger than the second section 63) for main bores having a diameter between 18 mm and 40 mm.

Further, a throttle valve head 52 may be provided with any one of, or any combination of, the various flow directing features described herein as well as modified flow directing features that persons of ordinary skill in the art will readily devise in view of the teachings herein. In other words, these features may be used separately or in any desired combination. Further, while various features were described that increase fluid flow velocity, flow directing features could also be provided that decrease a fluid flow velocity. Likewise, while certain features were described as promoting separation of two fluid flows, flow directing features like those disclosed herein could also be implemented to encourage mixing of fluid within the throttle body. Still further, the features discussed herein, separately or in any combination, could also be implemented on or associated with the throttle valve.

While representative flow directing features have been shown in these figures, many more shapes, sizes and orientations are possible; the illustrated implementations are not intended to limit the scope of the disclosure in any way. Further, the valve heads shown herein can be oriented in different ways/directions relative to the direction of air flow and need not be in the orientations shown in the drawings.

The flow directing features and boost venturi downstream of the throttle valve may, among other things, provide improved mixing of fuel and air in the main bore. Additionally, the throttle body so arranged may provide an improved pressure signal at the fuel outlet to improve engine operation during low speed and high load operating conditions that can cause engine lugging, provide a low cost system that provides fuel at relatively low pressure compared to higher pressure fuel injected systems, provide striation of air flows between the first and second sections of the main bore with the ability to provide more airflow in the first section and to the boost venturi if desired, control airflow and pressure signals at the fuel outlet to enhance management of the fuel and air mixture provided from the throttle body.

While the forms of the invention herein disclosed constitute presently preferred embodiments, many others are possible. For example, the flow directing features can have other shapes, orientations, locations and functions as would be appreciated by persons of ordinary skill in this art in view of this disclosure. It is not intended herein to mention all the possible equivalent forms or ramifications of the invention. It is understood that the terms used herein are merely descriptive, rather than limiting, and that various changes may be made without departing from the spirit or scope of the invention.

The invention claimed is:

1. A throttle body, comprising:
    a body having a main bore from which a fuel and air mixture is discharged for use by an engine;
    a throttle valve shaft carried by the body for rotation relative to the body,
    a throttle valve head carried by the throttle valve shaft and moveable between an idle position and an open position to control at least some fluid flow through the main bore; and
    a boost venturi open to the main bore;
    wherein the throttle valve head includes a non-planar portion that defines a flow directing feature to alter at least one of the velocity or direction of at least a portion of the fluid that flows in the main bore and relative to the boost venturi, wherein the main bore has an axis, and the boost venturi has an axis that is radially offset from the axis of the main bore, wherein the flow directing feature is oriented to increase air flow through the boost venturi when the throttle valve head is in the open position, wherein the boost venturi includes a projection that extends upstream of an inlet of the boost venturi and wherein the projection is arranged to direct air into the inlet of the boost venturi.

2. The throttle body of claim 1 wherein the flow directing feature includes a portion of the throttle valve head that is angled relative to an adjacent portion of the throttle valve head.

3. The throttle body of claim 2 wherein the portion of the throttle valve head that is angled relative to an adjacent portion of the throttle valve head is provided at an upstream portion of the throttle valve head relative to the orientation of the throttle valve head in the open position.

4. The throttle body of claim 2 wherein the portion of the throttle valve head that is angled relative to an adjacent portion of the throttle valve head is provided at a downstream portion of the throttle valve head relative to the orientation of the throttle valve head in the open position.

5. The throttle body of claim 1 wherein the flow directing feature is defined by one or more projections extending from the throttle valve head.

6. The throttle body of claim 5 wherein the projections define a channel through which air flows, and the channel is arranged to alter the velocity of air flowing therein.

7. The throttle body of claim 6 wherein the channel is centered about a plane that includes the axis of the boost venturi.

8. The throttle body of claim 1 wherein two flow directing features are provided on the throttle valve head with a channel defined between the flow directing features and wherein the channel is aligned with the boost venturi.

9. The throttle body of claim 1 which also includes a main fuel outlet through which fuel is discharged into the main bore and wherein the main fuel outlet opens into the boost venturi.

10. The throttle body of claim 1 which also includes a main fuel outlet through which fuel is discharged into the main bore and wherein the flow directing feature directs a portion of the air flowing in the main bore at the main fuel outlet.

11. The throttle body of claim 1 wherein the throttle valve shaft does not intersect the axis of the main bore, and wherein the throttle valve head divides the portion of the main bore in which the throttle valve head is received into a first section and a second section, the axis of the boost venturi extends through the first section and the flow directing feature directs air away from the second section and toward the first section.

12. The throttle body of claim 11 wherein the first section is larger than the second section.

13. The throttle body of claim 1 wherein the projection is received against a surface that defines the main bore, and wherein the projection is inclined from an upstream end that is adjacent to said surface to a downstream end adjacent to the inlet of the boost venturi.

14. A throttle body, comprising:
    a body having a main bore from which a fuel and air mixture is discharged for use by an engine and a fuel passage leading to the main bore to provide fuel into the main bore;
    a throttle valve head carried by the body and moveable between an idle position and a wide open position to control at least some fluid flow through the main bore;
    a boost venturi supported in the main bore at least in part by a flange of the boost venturi that is engaged with the body, the boost venturi having an inlet open to the main bore at a location downstream of the throttle valve head, an outlet open to the main bore and a passage extending between the inlet and the outlet; and
    a flow directing feature associated with the throttle valve head to alter at least one of the velocity or direction of at least a portion of the fluid that flows in the main bore and relative to the inlet of the boost venturi, and the fuel passage opens into the passage of the boost venturi so that fuel from the fuel passage is mixed with air flowing through the passage of the boost venturi and then discharged from the outlet into the main bore for mixing with air in the main bore, wherein the fuel passage is defined partially by a rod extending between the body and the boost venturi, and the rod is separate from the flange and also supports the boost venturi within the main bore, wherein the boost venturi directly engages a surface of the body that defines the main bore.

15. The throttle body of claim 14 wherein a main fuel outlet is defined in the boost venturi.

16. The throttle body of claim 14 wherein the flow directing feature includes a portion of the throttle valve head that is angled relative to an adjacent portion of the throttle valve head.

17. The throttle body of claim 14 wherein the flow directing feature is defined by one or more projections extending from the throttle valve head.

18. The throttle body of claim 17 wherein the projections define a channel through which air flows, and the channel is arranged to alter the velocity of air flowing therein.

* * * * *